United States Patent [19]
Hoshino

[11] Patent Number: 5,949,515
[45] Date of Patent: Sep. 7, 1999

[54] SPECTACLES

[75] Inventor: Ryuichi Hoshino, Osaka, Japan

[73] Assignee: Seika Trading Co., Ltd., Osaka, Japan

[21] Appl. No.: 09/024,748

[22] Filed: Feb. 17, 1998

[51] Int. Cl.[6] .............................. G02C 1/13; G02C 1/00
[52] U.S. Cl. ............................................ 351/41; 351/158
[58] Field of Search .................. 351/41, 60, 63, 351/158

[56] References Cited

U.S. PATENT DOCUMENTS

| | | | |
|---|---|---|---|
| 2,975,426 | 3/1961 | Rabr | 351/63 |
| 5,448,317 | 9/1995 | Huang | 351/158 |

Primary Examiner—Huy Mai
Attorney, Agent, or Firm—Wenderoth, Lind & Ponack, L.L.P.

[57] ABSTRACT

Spectacles which can be put on together with other ordinary spectacles to correct, among others, age-related or non-age-related farsightedness, and which are extremely lightweight, compact and easy to carry. The spectacles include an elongate bar member formed by molding a synthetic resin and having a pair of lens portions having edges, and a bridge portion coupling the edges of the respective lenses together. Temples are foldably coupled to both ends of the bar member by hinges. The lenses have a vertical width substantially equal to the vertical width of the temples. The bridge has an arcuately curving back face which serves as a nose pad. The bar member has at both ends thereof rodlike projections protruding forwardly beyond the front faces of the lenses. Also, cases for such spectacles are proposed.

4 Claims, 5 Drawing Sheets

SPECTACLES

BACKGROUND OF THE INVENTION

This invention relates to spectacles used for correcting age-related or non-age-related farsightedness.

Ordinary spectacles comprise metal lens frames coupled together by a bridge at their upper portions, nose pads mounted to opposed portions of the lens frames or the bridge, and temples mounted to the outer ends of the lens frames through hinges so as to be folded into juxtaposition with the lenses fitted in the respective lens frames.

Such spectacles include those for nearsightedness, age-related and non-age-related farsightedness and astigmia. Spectacles for age-related and non-age-related farsightedness are used by farsighted people e.g. to read and write small letters. Since farsighted people can see things spaced apart from them, spectacles are usually not needed while, for example, they are walking. Thus, it is desired that such spectacles be as lightweight as possible, foldable neatly and convenient to carry.

The narrower the vertical width of spectacles, the more neatly they are foldable. There are already known spectacles including glass or plastic lenses having a vertical width of mere 2–3 cm and mounted on equally narrow lens frames.

Such conventional age-related or non-age-related farsighted spectacles have nose pads made from synthetic resin and arranged spaced apart a predetermined distance from the lens frames so as to come right over the eye. The nose pads usually engage the constricted portion of the nose. Thus it is impossible to put on two spectacles having such nose pads at the same time. For example, it is impossible to put on age-related or non-age-related farsighted spectacles simultaneously with nearsighted or astigmatic spectacles.

Conventional, easy-to-carry spectacles include neatly foldable spectacles having narrow lens frames. But since this type of spectacles have conventional nose pads arranged in the shape of 'y, two of them cannot be put on simultaneously. Also, since the lens frames are made of metal, the entire spectacles are not lightweight enough.

In order to reduce the weight of spectacles, a synthetic resin, which is usually lower in specific weight than metals, should be used for as many parts of the spectacles as possible. But an easily moldable synthetic resin is usually soft and thus can be damaged very easily. Thus, plastic lenses formed by molding such a synthetic resin will be damaged easily by e.g. coming into contact with a hard object.

A first object of this invention is to provide spectacles which can be put on together with other ordinary spectacles to correct, among others, age-related or non-age-related farsightedness, and which are extremely lightweight, compact and easy to carry.

A second object of this invention is to provide spectacles made from an easily moldable synthetic resin and having means that prevent the lens surfaces from being rubbed and getting damaged by a hard object even when the spectacles are placed on such a hard object with the lens faces down.

SUMMARY OF THE INVENTION

According to this invention, there are provided spectacles comprising an elongate bar member formed by molding a synthetic resin and comprising a pair of lenses and a bridge connecting the lenses together, and a pair of temples foldably connected to the respective ends of the bar member by means of hinges, the lenses having a vertical width substantially equal to the vertical width of the temples, the bridge having a back surface formed so as to serve as a nose pad.

From another aspect of the invention, there are provided spectacles wherein the bar member is provided at both ends thereof with projections protruding forwardly beyond the front faces of the lenses.

The bridge coupling the lenses together has a back face as a nose pad. When the spectacles are put on, the nose pad engages the constricted portion of the wearer's nose. Thus, this nose pad is located below the nose pads of other ordinary spectacles worn together with the spectacles of the invention, so the spectacles of this invention can be put on together with other ordinary spectacles with their lenses superposed on the front faces of the lenses of the ordinary spectacles.

The lenses of the spectacles according to this invention have a vertical width substantially equal to the vertical width of the temples made of a synthetic resin or any other non-metallic material (e.g. 4–15 mm, preferably 4–10 mm). Thus, these lenses will never impair the function of the ordinary spectacles or block their middle to upper level views.

The spectacles according to this invention are put on as age-related or non-age-related farsighted spectacles together with ordinary spectacles.

Since the lenses and the bridge are integrally formed by molding a synthetic resin, they are extremely lightweight, and will add little weight even when they are used together with ordinary spectacles.

Since the lenses have a vertical width substantially equal to the vertical width of the temples. Thus, by pivoting the temples so as to be superposed on the lenses, the spectacles are folded into a thin pole. In this state, the spectacles can be neatly inserted into a clothes pocket like a fountain pen or a ballpoint pen.

The projections protruding forwardly beyond the front faces of the lenses keep the lenses off e.g. a table surface even if the spectacles are placed on the table with the lens faces down, thus preventing the lens surfaces from being rubbed and damaged by the table surface.

Other features and objects of the present invention will become apparent from the following description made with reference to the accompanying drawings, in which:

DETAILED DESCRIPTION OF THE PREFERRED EMBODIMENT

Figure 1:
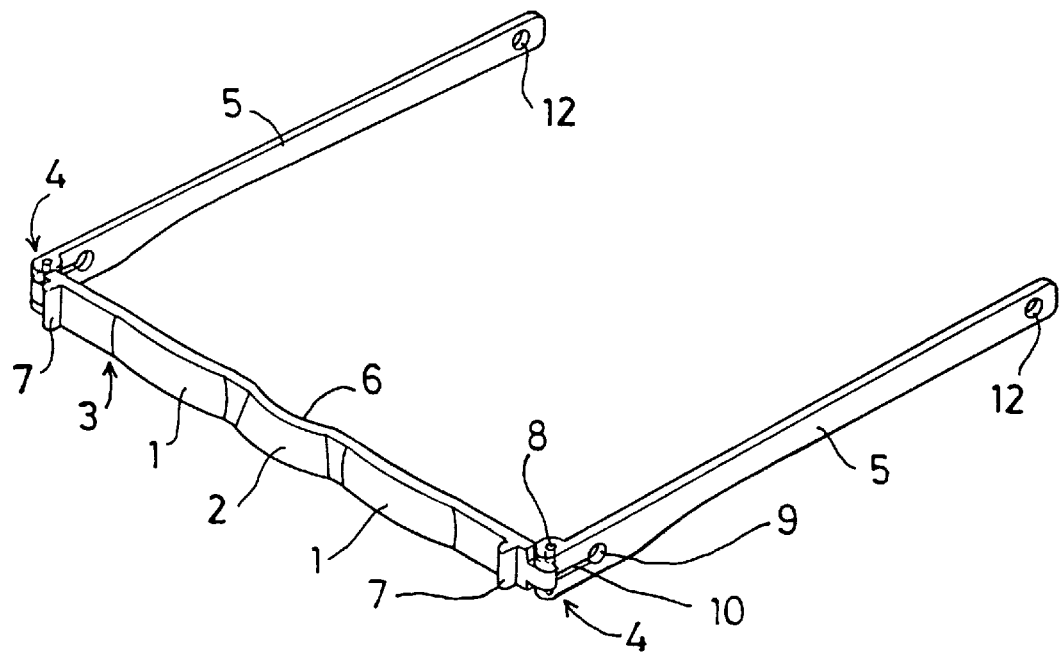
FIG. 1 is a perspective view of an embodiment.

An embodiment of this invention is described with reference to the attached drawings.

As shown in FIGS. 1–4, the spectacles of this embodiment, which are age-related farsighted spectacles, include an elongate bar member 3 formed by molding a synthetic resin and comprising a pair of lens portions 1 having edges, and a bridge portion 2 coupling the edges of the respective lenses 1 together. Temples 5 are foldably coupled to both ends of the bar member 3 by means of hinges 4. The lenses 1 have a vertical width w1 (see FIG. 3) substantially equal to the vertical width W2 of the temples 5. The bridge 2 has an arcuately curving back face which serves as a nose pad 6 (see FIG. 4). The bar member 3 has at both ends thereof rodlike projections 7 protruding forwardly beyond the front faces of the lenses 1. The bridge may be slightly curved according to the contour of the wearer's nose.

The bar member 3 may be made from any transparent synthetic resin but preferably from a synthetic resin that is high in transparency, easily injection-moldable or otherwise melt-moldable, and high in mechanical strength, such as acrylic resin or polycarbonate resin.

Figure 2:
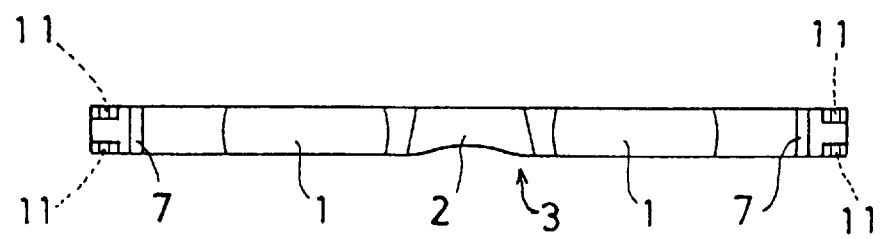
FIG. 2 is a front view of the embodiment.

As shown in FIGS. 1 and 2, the temples 5 foldably coupled to both ends of the bar member 3 by the hinges 4 are long bars made from a lightweight material such as the abovementioned resins. Formed in the front portion of each temple is a hole 8. Also formed in each temple is a crack-preventive round hole 9 and a slit 10 extending forwardly from the round hole 9 to the front end of the temple 5 to bifurcate the front portion of the temple between the round hole 9 and the front end. The hole 8 is formed in each of the bifurcated portions. The bar member 3 has at both ends thereof rotary pins 11 inserted in the holes 8 of the respective temples 5. Each hinge 4 is comprised of the rotary pins 11 and the hole 8.

Figure 3:
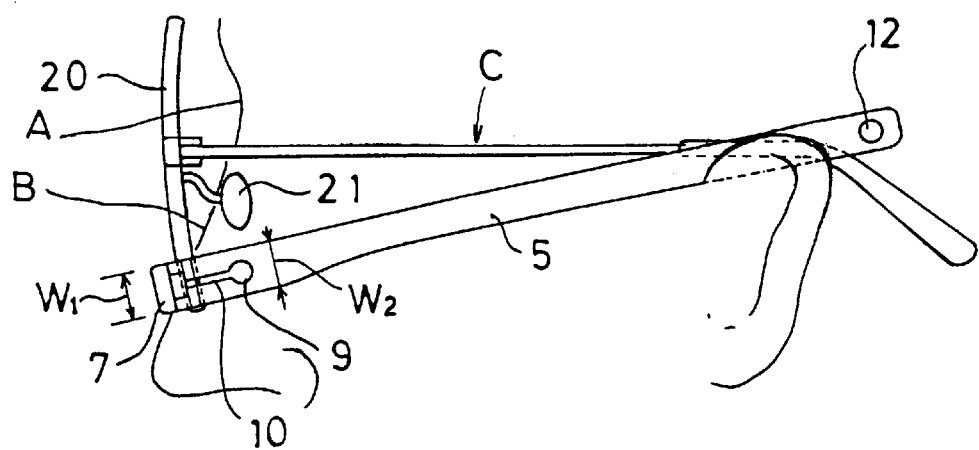
FIG. 3 is a side view of the embodiment in use.

Referring now to FIG. 3, the spectacles of this embodiment is used with ordinary spectacles C. In the state shown, the nose pad 6 engages the wearer's nose ridge B with the ʼy-shaped nose pads 21 of the spectacles C located over above the nose pad 6. Thus, the lenses 1, which are convex lenses, can be superposed on the lower portions of the lenses 20 of the spectacles C.

In the embodiment, the lenses 1 and the bridge 2 are portions of the integrally molded bar member 3. Thus, they are extremely lightweight and will hardly shift while in use. The wearer will feel comfortable as though he was not wearing spectacles at all. If the wearer frequently takes off and puts on the spectacles, a fall-preventive string (not shown) may be inserted in the holes 9 or holes 12 formed in the rear ends of the temples 5 and wound around the wearer's neck.

In the state shown in FIG. 3, in which the spectacles of the embodiment are superposed on the front side of the spectacles C, the narrow lenses 1 are superposed on the lower portions of the lenses 20 of the spectacles C, which are nearsighted lenses. The lenses 1 thus serve to correct farsightedness of the wearer when he is seeing an object located obliquely downward from him. Since the lenses 1 and the bridge 2 are integral with each other and transparent, they will never impair the function of the spectacles C.

Figure 4:
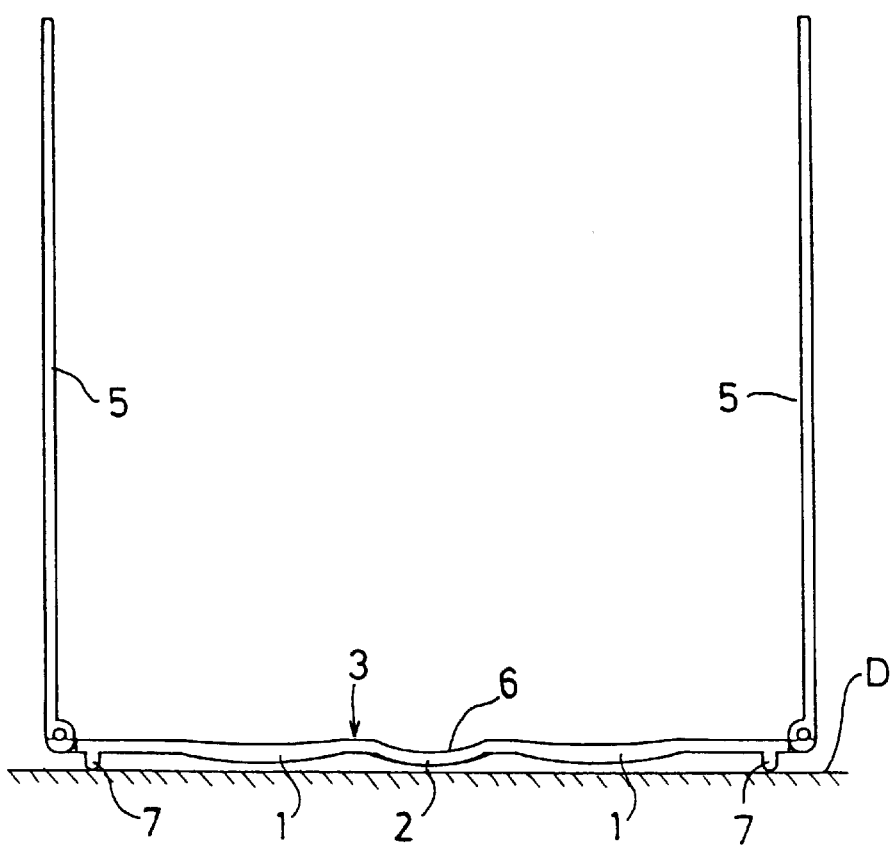
FIG. 4 shows the spectacles when they are placed on a flat object with the lens faces down.

As shown in FIG. 4, the projections 7 protruding forwardly beyond the front faces of the lenses 1 prevent the lenses 1 from getting damaged by coming into contact with and being rubbed by e.g. a table surface D.

FIGS. 5–8 show several embodiments of spectacle cases according to the present invention.

Figure 5:
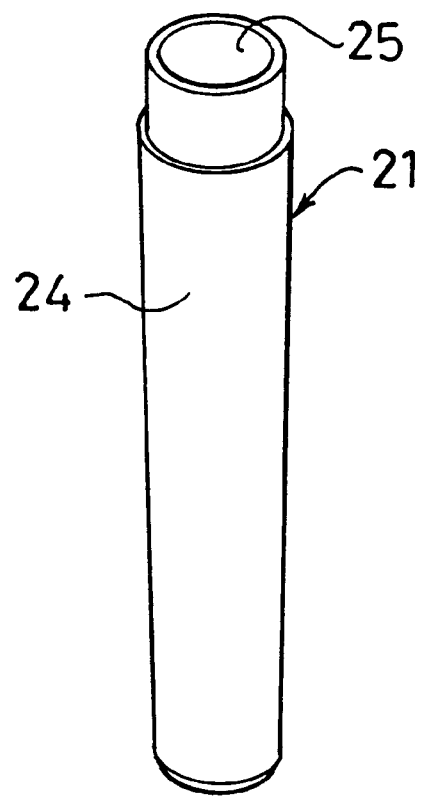
FIG. 5 is an exploded perspective view of an embodiment of a spectacle case according to the present invention.

As shown in FIGS. 5 and 6, the spectacle case 21 of the first embodiment is a cylindrical member comprising a cap 23 with a clip 22 and a cylindrical case body 24. The case has a cylindrical inner periphery having a cross-section along a plane perpendicular to the axis of the case in the shape of a circle having a radius of curvature R1 smaller than the radius of curvature R2 of the surfaces of the spectacle lenses 1. The cap 23 can be frictionally fitted on the case body 24 by inserting the top edge of the body 24 into the inner edge of the cap 23. The cap 23 can then be easily removed from the body 24 by pulling it up.

Figure 6A:
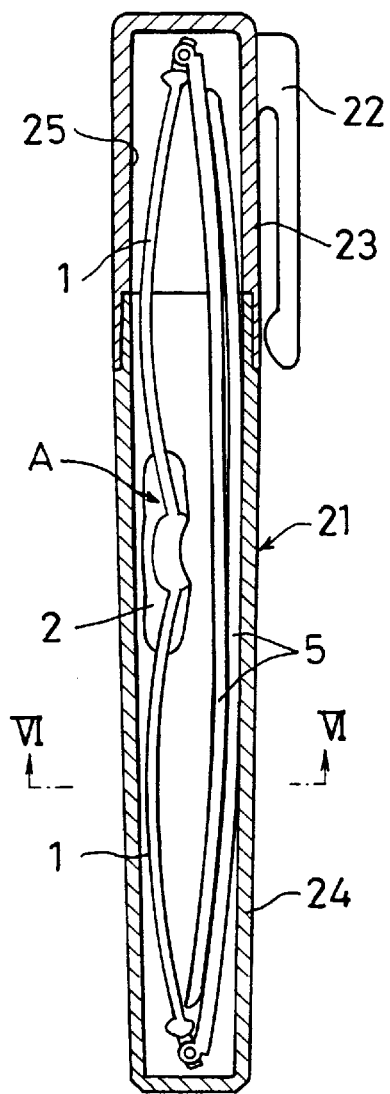
FIG. 6A is a vertical sectional view of the first embodiment of FIG. 5.

When the bridges 2 are folded onto the lenses 1 and the spectacles are put into the case 21, the spectacles can be neatly housed in the case 21 as shown in FIG. 6A. It can be folded into more flat shape by utilizing the resilience of the bridges 2.

Figure 6B:
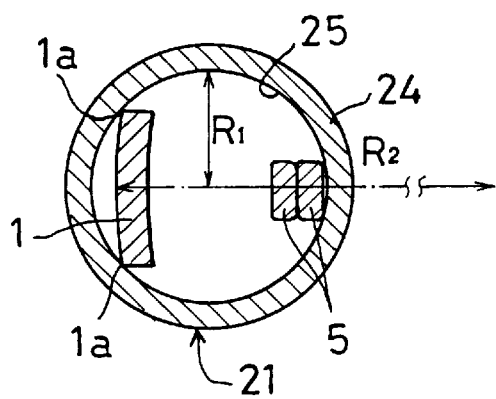
FIG. 6B is a sectional view taken along line VI—VI of FIG. 6A.

The narrow spectacles A are folded and put in the case 21. In this state, as shown in FIG. 6B, the top and bottom edges 1a of the lenses 1 are pressed against the inner periphery 25 of the case 21 by the resilience of the temples 5. The spectacles are thus stably held in the case with the lens surfaces other than the edges 6a of the lenses 1 kept out of contact with the inner periphery 25 of the case 21.

Figure 7:
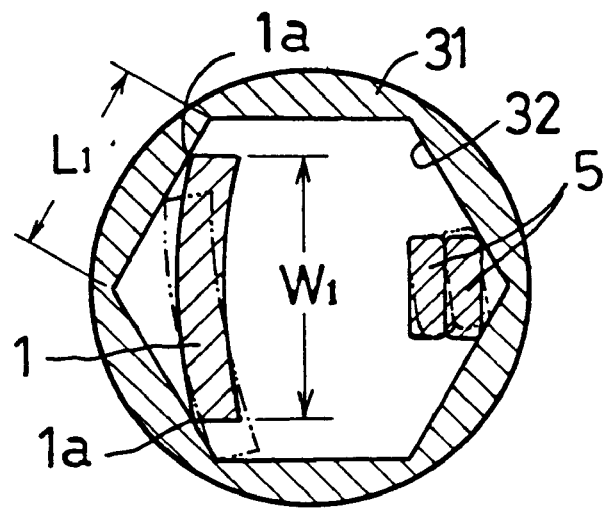
FIG. 7 is a sectional view of another embodiment.

FIG. 7 shows a spectacle case 31 of a second embodiment. The case 31 has a cylindrical outer periphery and an inner periphery 32 having a hexagonal section. That is, the inner periphery 32 has a section along a plane perpendicular to the axis of the case in the shape of a regular hexagon having a side length L1 shorter than the vertical width W1 of the spectacle lenses 1.

With this arrangement, when the spectacles are put in the case 31, the top and bottom edges 1a of the lenses 1 always contact two sides of the hexagonal inner periphery 32. Thus, even if the lenses 1 move in the case as shown by chain line in FIG. 7, the lens surfaces except the edges 1a of the lenses 1 will never touch the inner periphery 32.

Figure 8:
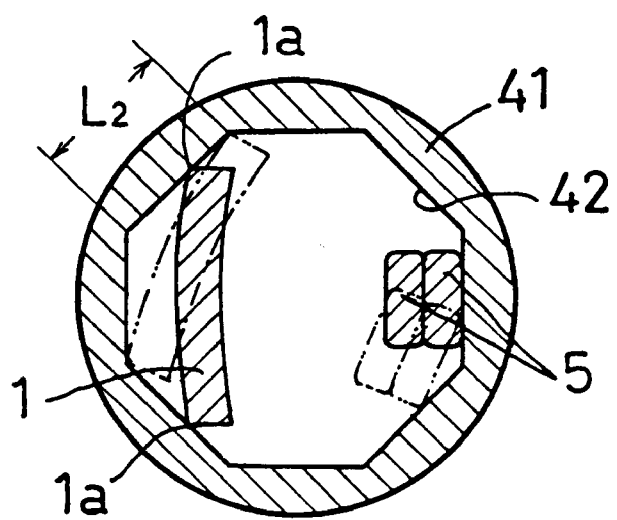
FIG. 8 is a sectional view of a still another embodiment.

FIG. 8 shows a spectacle case 41 of a third embodiment. The case 41 has a cylindrical outer periphery and an inner periphery 42 having a section along a plane perpendicular to the case axis in the shape of an octagon having a side length L2 shorter than the vertical width W1 of the spectacle lenses 1.

With this arrangement, when the spectacles are put in the case 41, the top and bottom edges 1a of the lenses 1 always contact two sides of the octagonal inner periphery 42. Thus, even if the lenses 1 move in the case as shown by chain line in FIG. 6, the lens surfaces except the edges 1a of the lenses 1 will never touch the inner periphery 42.

What is claimed is:

1. Spectacles comprising an elongate bar member formed by molding a synthetic resin and comprising a pair of lenses and a bridge connecting said lenses together, and a pair of temples foldably connected to the respective ends of said bar member by means of hinges, said lenses having a vertical width substantially equal to the vertical width of said temples, said bridge having a back surface formed so as to serve as a nose pad.

2. Spectacles as claimed in claim 1 wherein said bar member is provided at both ends thereof with projections protruding forwardly beyond the front faces of said lenses.

3. A case for spectacles comprising an elongate bar member formed by molding a synthetic resin and comprising a pair of lenses and a bridge connecting said lenses together, and a pair of temples foldably connected to the respective ends of said bar member by means of hinges, said lenses having a vertical width substantially equal to the vertical width of said temples, said case being cylindrical and having a circular inner periphery, the radius of curvature of said inner periphery is smaller than that of said lenses.

4. A case for spectacles comprising an elongate bar member formed by molding a synthetic resin and comprising a pair of lenses and a bridge connecting said lenses together, and a pair of temples foldably connected to the respective ends of said bar member by means of hinges, said lenses having a vertical width substantially equal to the vertical width of said temples, said case being cylindrical and having a polygonal section perpendicular to the axis of the case, the length of each side of the polygon being shorter than the vertical width of said lenses.

* * * * *

UNITED STATES PATENT AND TRADEMARK OFFICE
CERTIFICATE OF CORRECTION

PATENT NO.    : 5,949,515
DATED         : September 7, 1999
INVENTOR(S)   : Ryuichi Hoshino It is certified that error appears in the above-identified patent and that said Letters Patent is hereby corrected as shown below:

Title page,
Insert -- [30] Foreign Application Priority Data

February 19, 1997    [JP] Japan .......................... 9-035161
October 24, 1997     [JP] Japan .......................... 9-292370 --

ABSTRACT,
Line 1, delete "which";
Line 2, change "others" to -- other things --;
Line 3, change "which are" to -- can be --.

Column 1,
Line 24, after "of" insert -- a --;
Line 29, change "come" to -- be positioned --;
Line 51, change "others" to -- other things --.

Column 2,
Line 30, change "Since the" to -- The --;
Line 47, after "embodiment" insert -- of spectacles according to the invention --;
Line 54, delete "first";
Line 60, after "another" insert -- spectacle case --;
Line 61, after "another" insert -- spectacle case --;
Line 64, change "EMBODIMENT" to -- EMBODIMENTS --;
Line 65, change "An embodiment" to -- Embodiments --, change "is" to -- are --;

Column 3,
Line 35, change "is" to -- can be --;
Line 37, delete "over";

Column 4,
Line 12, change "It" to -- The spectacles --;
Line 13, change "more flat" to -- an even flatter --;
Line 33, change "except" to -- other than --;
Line 45, change "except" to -- other than --;
Line 51, delete "the";
Line 53, change "the" to -- a --;
Line 57, change "both" to -- said --;
Line 58, delete "the";
Line 62, delete "the";

UNITED STATES PATENT AND TRADEMARK OFFICE
CERTIFICATE OF CORRECTION

PATENT NO. : 5,949,515
DATED : September 7, 1999
INVENTOR(S) : Ryuichi Hoshino

It is certified that error appears in the above-identified patent and that said Letters Patent is hereby corrected as shown below:

<u>Column 4, cont'd</u>
Line 64, delete "the";
Line 67, change "is" to -- being --.

<u>Column 5,</u>
Line 4, delete "the";
Line 6, change "the" to -- a --.

Signed and Sealed this

Eleventh Day of June, 2002

Attest:

JAMES E. ROGAN
Attesting Officer
Director of the United States Patent and Trademark Office